United States Patent
Matheny

(10) Patent No.: US 7,780,420 B1
(45) Date of Patent: Aug. 24, 2010

(54) TURBINE BLADE WITH A FOAM METAL LEADING OR TRAILING EDGE

(75) Inventor: Alfred P. Matheny, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 951 days.

(21) Appl. No.: 11/600,455

(22) Filed: Nov. 16, 2006

(51) Int. Cl.
F01D 5/14 (2006.01)

(52) U.S. Cl. .................................................. 416/241 R

(58) Field of Classification Search ............. 416/223 R, 416/229 A, 229 R, 241 R
See application file for complete search history.

(56) References Cited

U.S. PATENT DOCUMENTS

| | | | |
|---|---|---|---|
| 2,917,384 A * | 12/1959 | Max ............................ | 419/14 |
| 3,294,366 A | 12/1966 | Coplin | |
| 3,758,234 A | 9/1973 | Goodwin | |
| 3,762,835 A | 10/1973 | Carlson et al | |
| 3,778,188 A | 12/1973 | Aspinwall | |
| 3,844,728 A | 10/1974 | Kear et al | |
| 3,892,612 A | 7/1975 | Carlson et al | |
| 4,006,999 A | 2/1977 | Brantley et al. | |
| 4,111,606 A | 9/1978 | Prewo | |
| 4,247,259 A | 1/1981 | Saboe et al. | |
| 5,174,024 A | 12/1992 | Sterrett | |
| 5,348,446 A | 9/1994 | Lee et al. | |
| 5,449,273 A | 9/1995 | Hertel et al. | |
| 5,876,651 A | 3/1999 | Blackburn, Jr. et al. | |
| 5,887,332 A | 3/1999 | Champenois et al. | |
| 5,965,240 A | 10/1999 | Blackburn et al. | |
| 6,132,857 A | 10/2000 | Champenois et al. | |
| 6,682,022 B2 | 1/2004 | Battisti | |
| 6,960,065 B2 | 11/2005 | Leach | |
| 7,156,622 B2 * | 1/2007 | Schreiber ..................... | 416/224 |
| 2006/0216154 A1 * | 9/2006 | McMillan ................ | 416/241 R |
| 2007/0122606 A1 * | 5/2007 | Meier et al. .............. | 428/304.4 |

FOREIGN PATENT DOCUMENTS

WO WO 2005/056220 A1 * 6/2005

* cited by examiner

*Primary Examiner*—Edward Look
*Assistant Examiner*—Nathaniel Wiehe
(74) *Attorney, Agent, or Firm*—John Ryznic

(57) ABSTRACT

A thin compressor blade used in a small aircraft gas turbine engine, in which the blade includes a main blade portion formed from a fiber reinforced resinous composite material to provide a lightweight and strong blade, and in which the leading edge or the trailing edge of the blade is formed from a foam metal reinforced composite material that defines a sharp edge for improved performance of the thin blade. The fibers of the main body extend into the edge region in order that the resin used to bind the foam metal will also bind with the fibers of the laminates to secure the edge to the main blade body. The blade tip can also be formed from the porous foam metal and resin material to make a strong and lightweight rotor blade.

4 Claims, 2 Drawing Sheets

TURBINE BLADE WITH A FOAM METAL LEADING OR TRAILING EDGE

BACKGROUND OF THE INVENTION

1. Field of the Invention

The present invention relates generally to fluid reaction surfaces, and more specifically to a thin rotor blade.

2. Description of the Related Art Including Information Disclosed Under 37 CFR 1.97 and 1.98

A turbomachine, such as a compressor in an aircraft gas turbine engine, includes an airfoil portion with leading edge and trailing edge portions extending from the airfoil portion. Rotor blades have been made from a single material in the early prior art. In order to improve on the performance of the turbomachine, the rotor blades have been made from composite materials in order to lighten the blade as well as increase the blade's strength. In some situations, the leading edge or trailing edge of the blade is made of a separate material in order to reduce damage from a foreign object striking the edge during rotor blade operation. In a small compressor, a blade without a sharply defined leading or trailing edge leads to a significant loss in performance.

In a rotor blade used in a compressor, the leading edge and trailing edge need to be thin or sharp in order to produce a high performance in the compressor. A prior art rotor blade made from a composite material such as a composite laminated material requires a relatively large radius to wrap the laminated material around the edges of the blade. U.S. Pat. No. 3,762,835 issued to Carlson et al on Oct. 2, 1973 and entitled FOREIGN OBJECT DAMAGE PROTECTION FOR COMPRESSOR BLADES AND OTHER STRUCTURES AND RELATED METHODS discloses a composite compressor blade having a leading edge portion formed from a fine wire mesh clad in nickel. Because of the laminates, the leading edge of the blade is rounded and not sharp.

U.S. Pat. No. 3,758,234 issued to Goodwin on Sep. 11, 1973 and entitled FIBER BLADE WITH LEADING EDGE REINFORCEMENT discloses a rotor blade in a gas turbine engine in which two strips of metal are joined together at the leading edge over laminations of carbon fiber reinforced resin that form the made body of the blade. The leading edge of the blade is rounded and therefore does not provide the sharp edge as in the present invention.

In a rotor blade made from a fiber reinforced composite material such as carbon fiber embedded within a polyester resin, sand particles will severely damage the leading edge portion of the blade. This type of blade is made of strong and lightweight material, but cannot withstand the damage from the sand particles.

It is therefore an object of the present invention to provide for a small rotor blade that will have a sharp leading or trailing edge in order to provide higher performance over the cited prior art references, and to have the lightweight and strength required to withstand damage from sand particles or other foreign objects that would damage the leading or trailing edge.

BRIEF SUMMARY OF THE INVENTION

A composite rotor blade having a main airfoil portion made from a strong and lightweight material such as carbon reinforced laminated material, and leading edge or trailing edge portions made from a porous foam metal material with a resin embedded within the foam metal. The foam metal leading or trailing edges are formed with a sharp edge in order to provide high performance for a small rotor blade. The fibrous material used in the main airfoil portion is positioned to extend into the leading or trailing edge portion and provide a means for the resin to secure the edge to the airfoil body when a resin is imbedded into the foam metal. The foam metal reinforced leading or trailing edge of the blade provides for a strong edge that will withstand foreign object strikes such that the performance of the blade will not be degraded.

DETAILED DESCRIPTION OF THE INVENTION

Figure 1:
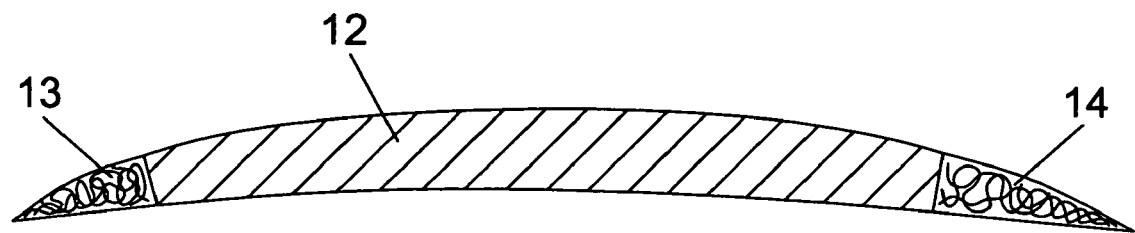
FIG. 1 shows a top view of a cross section of a rotor blade of the present invention.
Figure 3:
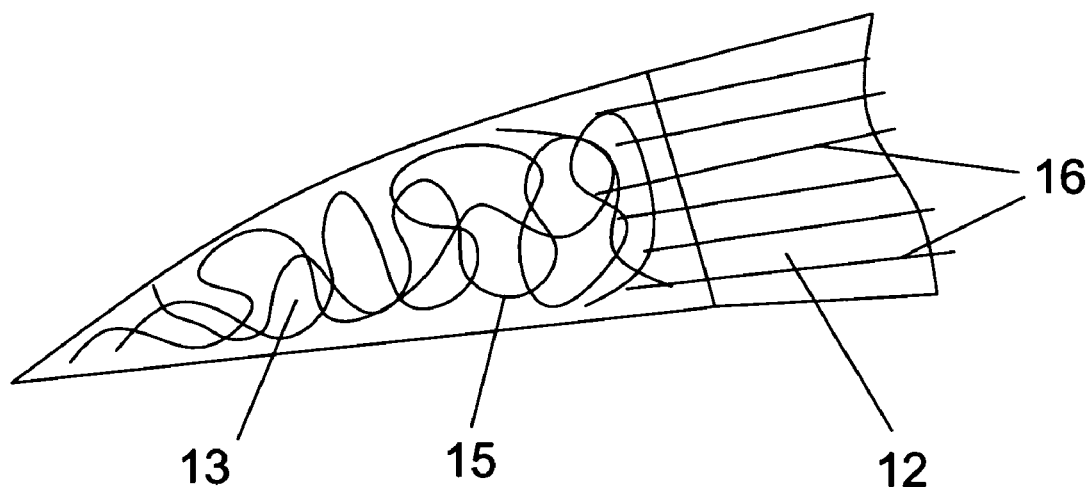
FIG. 3 shows a cross section view of the leading edge portion of the blade.

The present invention is a rotor blade used in a turbomachine such as a compressor in an aircraft gas turbine engine. A rotor blade as shown in FIG. 1 includes a main airfoil portion 12 made of a high strength and light weight materials such as carbon fiber reinforced resin. The leading edge 13 and trailing edge 14 portions are made of a foam metal reinforced resin composite material. The foam metal takes the shape of the leading or trailing edge of the blade such that a sharp edge is formed. In order to secure the foam metal edge to the airfoil main body 12, the fibers used in the laminates are made to extend into the edge portion of the blade. FIG. 3 shows the fibers 16 from the laminated main body 12 of the blade to extend into the leading edge region 13. the foam metal fibers 15 are randomly arranged to form the leading edge for the blade. A resinous material is injected into the foam metal fibers 15 to from a solid composite leading edge portion for the blade that includes a sharp edge and a strength capable of withstanding foreign object strikes such as by sand particles that would severely damage the composite laminated material for which the main body portion of the blade is formed from.

In the present invention of FIG. 1, both the leading edge and trailing edge portions of the blade are formed from the foam metal reinforced resin as described above. However, a blade can be formed with only a leading edge portion if desired with the trailing edge portion formed from the composite laminated material of which the main blade body portion is formed.

Figure 2:
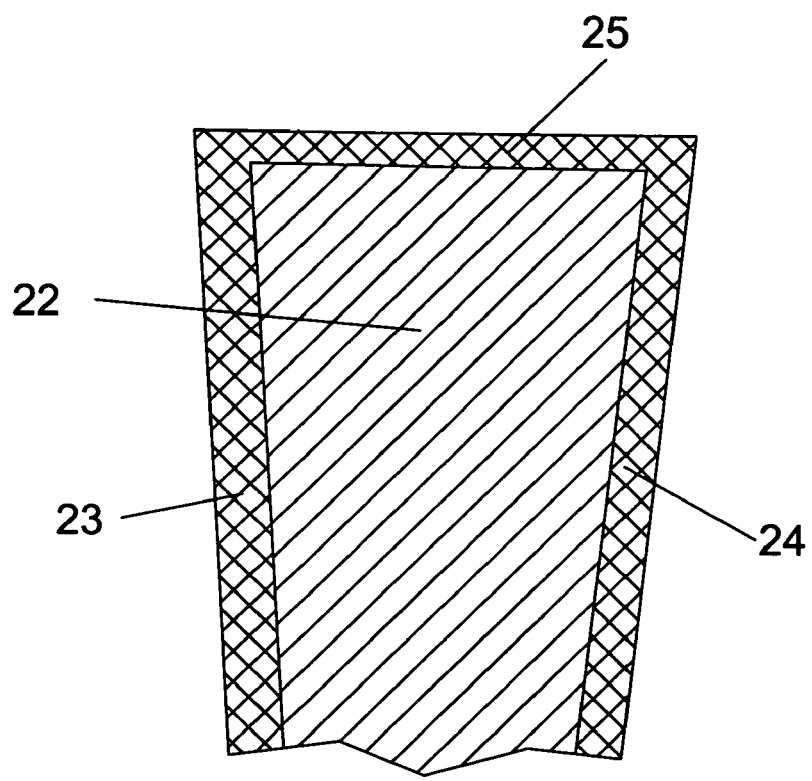
FIG. 2 shows a front view of a cross section of the rotor blade of the present invention.

FIG. 2 shows a second embodiment of the present invention in which the tip 25 of the blade 22 is also formed with the foam metal material that makes up the leading edge 23 and trailing ledge 24 portions of the blade in FIG. 1. In the case of a small rotor blade used in a compressor of an aircraft gas turbine engine, the compressor blade will be very thin.

Figure 4:
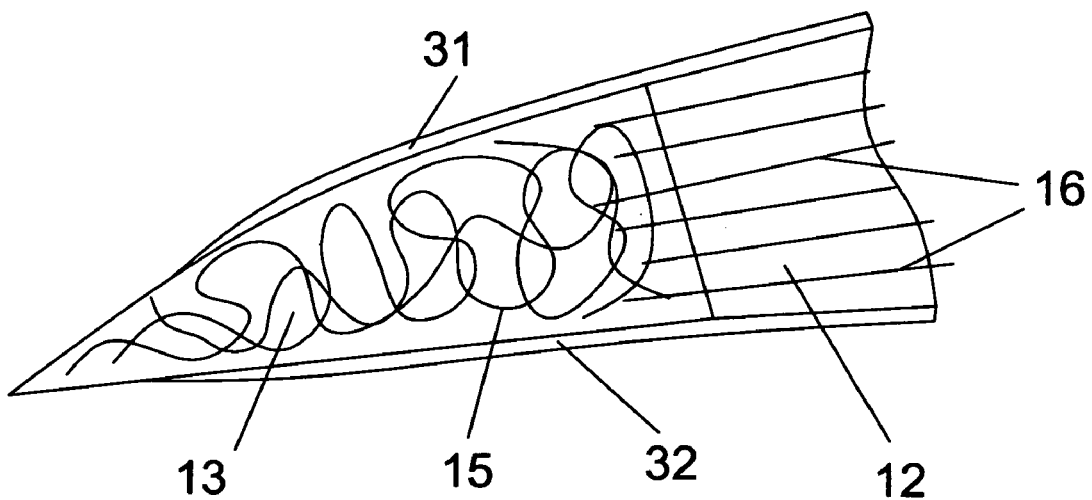
FIG. 4 shows a cross section of the leading edge portion of a second embodiment of the present invention.

FIG. 4 shows a third embodiment of the present invention in which a layer of a composite laminated material such as carbon fiber reinforced with resin is applied over the pressure side and suction side of the blade. The suction side layer 31 and the pressure side layer 32 is applied up to a point from the leading or trailing edge that will not prevent a sharp edge formed from the foam metal from being formed. The layers 31 and 32 add strength to the composite blade.

I claim:

1. A thin rotor blade for use in a turbomachine, the blade comprising:
    a main body portion formed from a composite laminated material;
    a leading edge region formed from a foam metal embedded with a resinous material, the leading edge having a sharp edge; and,
    the fibers of the composite laminated material extending into the leading edge region such that the resin of the foam metal also engages with the fibers to secure the leading edge to the blade main body portion.

2. The thin rotor blade of claim 1, and further comprising:
    the blade tip is formed from a foam metal reinforced resin composite material.

3. The thin rotor blade of claim 1, and further comprising:
    a trailing edge formed from a foam metal embedded with a resinous material with a sharp edge.

4. A thin rotor blade for use in a turbomachine, the blade comprising:
    a main body portion formed from a composite laminated material; and,
    a leading edge region formed from a foam metal embedded with a resinous material, the leading edge having a sharp edge;
    the blade tip is formed from a foam metal reinforced resin composite material; and,
    the leading edge and the blade tip are a single piece foam metal.

* * * * *